United States Patent
Grosso et al.

(10) Patent No.: US 9,992,129 B2
(45) Date of Patent: Jun. 5, 2018

(54) APPARATUS AND METHOD FOR COMMUNICATING OVER A PLURALITY OF COMMUNICATION LINKS

(71) Applicant: Telefonaktiebolaget LM Ericsson (publ), Stockholm (SE)

(72) Inventors: Renato Grosso, Genoa (IT); Amber Hu, Beijing (CN); Lorenzo Marchionini, Genoa (IT); Bo Xu, Beijing (CN)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 154 days.

(21) Appl. No.: 14/915,145

(22) PCT Filed: Sep. 5, 2013

(86) PCT No.: PCT/CN2013/082972
§ 371 (c)(1),
(2) Date: Feb. 26, 2016

(87) PCT Pub. No.: WO2015/032046
PCT Pub. Date: Mar. 12, 2015

(65) Prior Publication Data
US 2016/0212056 A1 Jul. 21, 2016

(51) Int. Cl.
*H04L 12/891* (2013.01)
*H04L 12/26* (2006.01)
*H04L 12/709* (2013.01)

(52) U.S. Cl.
CPC .......... *H04L 47/41* (2013.01); *H04L 43/0882* (2013.01); *H04L 43/0894* (2013.01);
(Continued)

(58) Field of Classification Search
None
See application file for complete search history.

(56) References Cited

U.S. PATENT DOCUMENTS

2010/0011230 A1* 1/2010 Mater .................. G06F 1/3215
713/320
2011/0058487 A1 3/2011 Kotrla et al.
(Continued)

FOREIGN PATENT DOCUMENTS

CN 101005327 A 7/2007
CN 101237391 A 8/2008
(Continued)

OTHER PUBLICATIONS

European Communication, dated Mar. 29, 2017, in connection with European Application No. 13892855.1, all pages.
PCT International Search Report, dated Jun. 13, 2014, in connection with International Application No. PCT/CN2013/082972, all pages.
IEEE Std 802.3az-2010 (Amendment to IEEE Std 802.3-2008), Part 3: Carrier Sense Multiple Access with Collision Detection (CSMA/CD) Access Method and Physical Layer Specifications, Amendment 5: Media Access Control Parameters, Physical Layers, and Management Parameters for Energy-Efficient Ethernet, Oct. 27, 2010, 302 pages.
(Continued)

*Primary Examiner* — Mohammad S Adhami
(74) *Attorney, Agent, or Firm* — Leffler Intellectual Property Law, PLLC

(57) ABSTRACT

A method in a first network entity which is capable of communicating over a plurality of communication links with a second network entity. The first network entity determines a level of transmit traffic transmitted over the plurality of communication links to the second network entity. The first network entity further determines a level of receive traffic received over the plurality of communication links from the second network entity. The first network entity further determines if the level of transmit traffic and/or the level of receive traffic meet one or more requirements for changing a number of active links of the communication links. If so, the first network entity changes the number of active links independently of the second network entity.

18 Claims, 2 Drawing Sheets

(52) U.S. Cl.
CPC ............ *H04L 43/16* (2013.01); *H04L 45/245* (2013.01); *Y02B 60/33* (2013.01)

(56) References Cited

U.S. PATENT DOCUMENTS

| | | | | |
|---|---|---|---|---|
| 2011/0211585 A1* | 9/2011 | Kodaka | ................... | H04L 45/00 370/401 |
| 2011/0243032 A1* | 10/2011 | Jenne | ...................... | H04L 12/12 370/254 |

FOREIGN PATENT DOCUMENTS

| | | | |
|---|---|---|---|
| CN | 102215605 A | 10/2011 | |
| CN | 103023698 A | 4/2013 | |
| WO | 2012155987 A1 | 11/2012 | |

OTHER PUBLICATIONS

IEEE Std 802.3ad-2000 (Amendment to IEEE Std 802.3, 1998 Edition), Amendment to Carrier Sense Multiple Access with Collision Detection (CSMA/CD) Access Method and Physical Layer Specifications—Aggregation of Multiple Link Segments, Mar. 30, 2000, 183 pages.

IEEE Std 802.1AX-2014 (Revision of IEEE Std 802.1AX-2008), IEEE Standard for Local and metropolitan area networks—Link Aggregation, Dec. 10, 2014, 344 pages.

H. Imaizumi et al., Power Saving Mechanism based on Simple Moving Average for 802.3ad Link Aggregation, 6 pages.

* cited by examiner

APPARATUS AND METHOD FOR COMMUNICATING OVER A PLURALITY OF COMMUNICATION LINKS

TECHNICAL FIELD

Aspects of the present invention relates to an apparatus and method for communicating over a plurality of communication links. For example, aspects of the invention relate to communicating over a link aggregation group.

BACKGROUND

Power saving is becoming an important issue for network devices, due in part to the rapidly growing Internet and increasing bandwidth requirement from end users, as well as a generally increasing energy cost.

Link aggregation according to IEEE 802.3ad, is widely used to increase bandwidth between two network entities. For example, link aggregation is used at the aggregation level of Mobile Backhaul, Metro networks, and Optical networks. IEEE 802.1ax (former clause 43 of IEEE 802.3) standard has defined the mechanism for a Link Aggregation Control Protocol (LACP). LACP enables one or more links to be aggregated together to form a Link Aggregation Group (LAG). This allows a Media Access Control (MAC) Client to treat the LAG as if it were a single link.

Link aggregation achieves higher bandwidth by combining several full duplex point-to-point links, e.g. operating at the same data rate. It also increases availability since a single link failure will not cause the LAG failure as a MAC Client.

LACP works by sending frames or LACP Data Units (LACPDUs) down all links that have the protocol enabled. If there is a device on the other end of the link that also has LACP enabled, LACP will also independently send frames along the same links enabling the two units to detect multiple links between themselves and then combine them into a single logical link. LACP can be configured in one of two modes: active or passive. In active mode it will always send frames along the configured links. In passive mode however, it acts as "speak when spoken to", and therefore can be used as a way of controlling accidental loops (as long as the other device is in active mode).

Links may be dynamically added or removed from a LAG. Upon a detected link failure, the LAG dynamically routes traffic on active links, guaranteeing traffic delivery although at a reduced rate. Thus, the LAG provides redundancy. LACP uses a Hash function to uniformly balance the traffic load among all the active links. The LACP mechanism can dynamically adjust the number of aggregated links according to a negotiation between peer ends.

In "Power saving mechanism based on Simple Moving Average for 802.3ad Link Aggregation", Hideaki Imaizumi, GLOBECOM Workshops, 2009 IEEE, Nov. 30, 2009-Dec. 4, 2009, a power saving mechanism for LAG is based on Simple Moving Average. The method relies on a negotiation protocol (handshake) for both nodes connected to an aggregated link, to send messages between the nodes. An estimation algorithm is used to estimate an appropriate number of active links to comprise the aggregated link in accordance with the current rate of traffic outbound on the link. The estimation algorithm and the adoption of a dedicated handshake messages introduce a relatively long reaction time before the number of active links is varied. In addition, this arrangement may result in interoperability issues if the nodes have different manufacturers, due to possible handshake sequence misalignments or proprietary behaviors.

Furthermore, such a system may not allow backward interoperability with legacy nodes operating a LAG.

Related issues apply to Multi-Chassis Link Aggregation Group (MC-LAG) or Distributed Resilient Network Interconnect (DRNI).

SUMMARY

According to a first aspect of the present invention, there is provided a method in a first network entity which is capable of communicating over a plurality of communication links with a second network entity. The first network entity determines a level of transmit traffic transmitted over the plurality of communication links to the second network entity. The first network entity also determines a level of receive traffic received over the plurality of communication links from the second network entity. The first network entity further determines if the level of transmit traffic and/or the level of receive traffic meet one or more requirements for changing a number of active links of the communication links, and if the requirements are met, changes the number of active links independently of the second network entity.

Thus, the adaptation of the number of the links is carried out more efficiently. The adaptation is operable with a legacy network entity.

According to a second aspect of the present invention, there is provided a network entity configured to communicate over a plurality of communication links with a remote network entity. The network entity comprises a first counter configured to measure a level of receive traffic received over the plurality of communication links from the remote network entity, and a second counter configured to measure a level of transmit traffic transmitted over the plurality of communication links to the remote network entity. The network entity further comprises a processing unit configured to determine if the level of transmit traffic and/or the level of receive traffic meet one or more requirements for changing a number of active links of the communication links. The processing unit is configured to change the number of active links independently of the remote network entity.

According to a third aspect of the present invention, there is provided a system comprising a first network entity and a second network entity capable of communicating over a plurality of communication links. The first network entity comprises a first counter configured to measure a level of receive traffic received over the plurality of communication links from the remote network entity, and a second counter configured to measure a level of transmit traffic transmitted over the plurality of communication links to the remote network entity. The first network entity further comprises a processing unit configured to determine if the level of transmit traffic and/or the level of receive traffic meet one or more requirements for changing a number of active links of the communication links. The processing unit is configured to change the number of active links independently of the second network entity.

According to another aspect of the present invention, there is provided a computer program product, configured when run on a computer to conduct a method according to any one of methods defined in the appended claims.

BRIEF DESCRIPTION OF THE DRAWINGS

For a better understanding of examples the present invention, and to show more clearly how the examples may be carried into effect, reference will now be made, by way of example only, to the following drawings in which.

DETAILED DESCRIPTION

Aspects of the invention relate to an energy aware plurality of communications links, e.g. arranged in a Link Aggregation Group (LAG). The LAG is configured to change the number of active links as a function of the actual traffic load, such that the optimal number of links are available for traffic. The LAG is configured to save power by having a minimum number of links operational to handle the traffic. The LAG is arranged to vary the number of active links with an efficient process.

Figure 1:
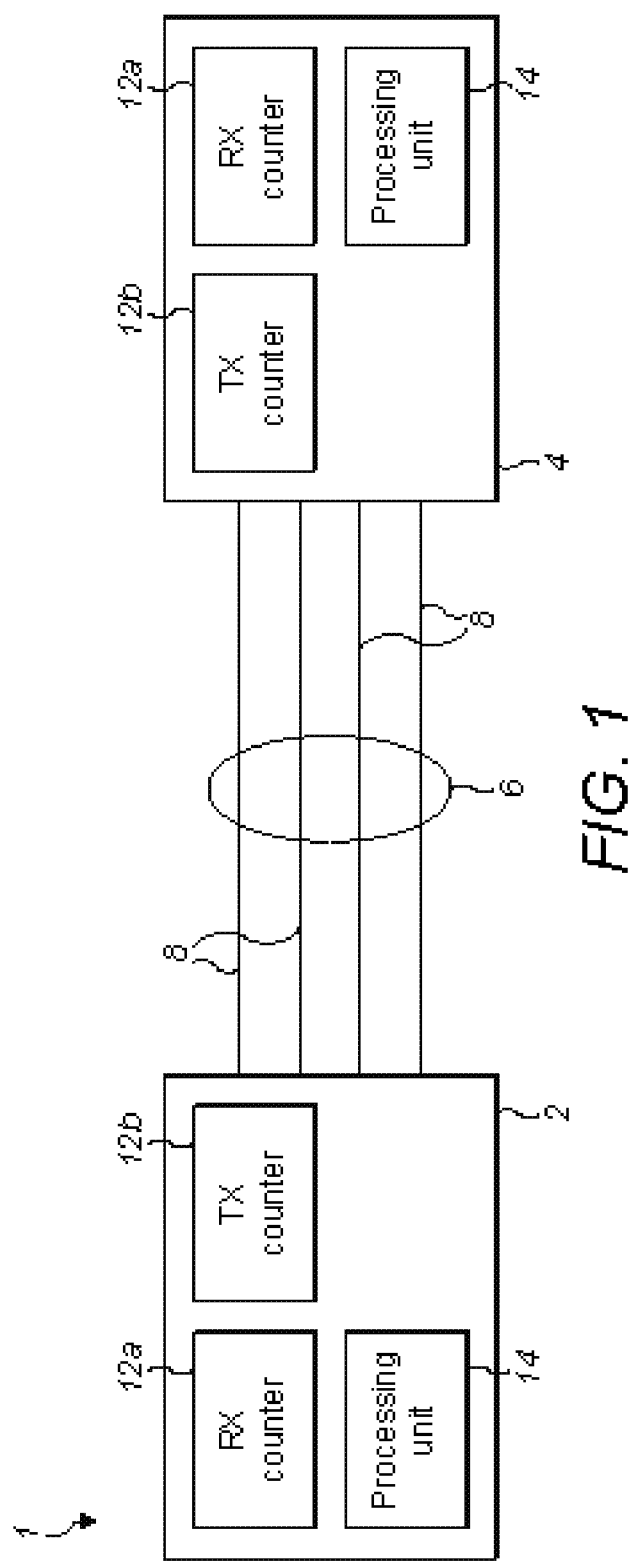
FIG. 1 shows an example of a network with a link aggregation group, LAG, between a first network entity and a second network entity.

FIG. 1 shows an example of a system 1 according to an aspect of the invention. The system 1 comprises a first network entity 2 and a second network entity 4. The first and second network entity 2,4 are connected by a plurality of communication links 8. The plurality of links 8 form a link aggregation group 6. The first and second network entity 2,4 are configured to use one or more of the links 8 to transport traffic between the first and second network entity 2,4. In some aspects, the link aggregation group 6 is considered as a single logical link by the first and second network entity 2,4.

The communication links 8 may be of any known type, for example, optical fiber or electrical (e.g. copper) links. The links 8 are arranged for bi-directional traffic.

The first network entity 2 comprises a receive (first) counter 12a configured to measure an amount or level of receive traffic for the plurality of links 8. The first network entity 2 also comprises a transmit (second) counter 12b configured to measure an amount or level of transmit traffic for the plurality of links 8.

In the example shown, the second network entity 4 comprises a receive counter 12a configured to measure an amount or level of receive traffic for the plurality of links 8. The first network entity 2 also comprises a transmit counter 12b configured to measure an amount or level of transmit traffic for the plurality of links 8.

The counters 12a,12b measures an amount of receive and transmit traffic for the LAG 6 which is handled by the first or second network entity 2, 4 in which the counters 12a,12b are located. The level of receive traffic for the first network entity 2 will be the same as the level of transmit traffic for the second network entity 4. The measured level of receive traffic refers only to traffic received over the links 8, i.e. from the other of the first or second network entity. The measured level of transmit traffic refers only to traffic transmitted over the links 8, i.e. to the other of the first or second network entity.

The counters 12a,12b are shown as separate functional units. The counters 12a,12b may be integrated into the same unit, software or hardware, and may or may not be physically separate.

The first network entity 2 comprises a processing unit 14. In the example shown, the second network entity 4 comprises a processing unit 14. The processing unit 14 is configured to receive a measured amount of receive and transmit traffic for the LAG 6 from the counters 12a,12b in the same network entity. The processing unit 14 is configured to determine a change of the number of links 8 which are active. The processing unit 14 is configured to base the determination of the change of the number of links 8 which are active on the measured amount of receive and transmit traffic. In particular, the processing unit 14 is configured to base the determination of the change of the number of links 8 which are active only on the measured amount of receive and transmit traffic. In some examples, the determination is based only on the measured amount of receive and transmit traffic in that network entity. The processing unit 14 is configured to determine if the level of receive and/or transmit traffic meets one or more requirements for changing the number of active links 8.

The first network entity 2 determines a change of the number of links 8 which are active independently from the second network entity 4. The first and second network entity 2,4 do not carry out a handshaking procedure or exchange messages in order to determine a change in the number of active links 8. The processing units 14 vary the number of active links 8 without message exchange between the network entities relating to the variation in the number of active links. In some aspects, no messages relating to changing the number of active links are sent or received prior, during or after the changing of the number of active links. Thus, the number of links is changed with no direct handshaking of information. The LAG optimization is carried out only with the measured traffic information.

In order to determine if the receive and transmit traffic meets the one or more requirements, the measured levels of receive and transmit traffic are compared with one or more thresholds. For example, the traffic is compared with an upper threshold indicating that more active links are required, and the traffic is compared with a lower threshold indicating that fewer active links are required. The receive traffic and transmit traffic are compared separately with the thresholds.

The processing unit 14 is configured to activate an additional link 8 if either the receive traffic or the transmit traffic exceeds the upper threshold. The processing unit 14 is configured to inactivate a link 8 if both the receive traffic and the transmit traffic are below the lower threshold. The processing unit 14 is arranged to determine the thresholds based on the current number of active links. For example, for each number of active links, there is an upper and a lower threshold against which the transmit and receive traffic is compared.

Each of the thresholds is a pre-determined threshold. For example, the thresholds are stored in the processing unit 14 or in a memory accessible by the processing unit 14.

The first and second network entity 2,4 comprise one or more further components to handle the transmit and receive traffic, e.g. a switching matrix. In some examples, the first and second network entity 2,4 are connected to one or more further network entity as part of a larger network.

In one scenario, traffic reduces in only one direction, e.g. from the second network entity 4 to the first network entity 2. If traffic in only one direction is reduced below the lower threshold, no actions are taken, i.e. the number of active links is not changed. This is because only one of the transmit and receive traffic have fallen below the lower threshold, and not both.

In a further scenario, the counters 12a, 12b measures that one direction has a low level of traffic (i.e. below the lower threshold), and traffic in the other direction, e.g. from the first network entity 2 to the second network entity 4 is also reduced (i.e. below the lower threshold).

The processing unit 14 separately compares both the receive traffic and transmit traffic with the lower threshold. If the level of both of the receive traffic and transmit traffic is lower than the lower threshold, then the processing unit 14 determines that a currently active link 8 should be made inactive. If the level of one of the measured receive traffic or transmit traffic is below the lower threshold and one of the receive traffic or transmit traffic is above the lower threshold, then no link is deactivated. This ensures that the number of links is sufficient for the traffic of both directions of the LAG 6.

In another scenario, traffic in either direction increases, e.g. from the first network entity 2 to the second network entity 4. As soon as the first network entity 2 and the second network entity 4 detects that levels of transmit or receive traffic is above a given threshold, they independently both can select a given link that shall enter the LAG and the given ports will be fully enabled. The detection of traffic level and comparison with a threshold is separate for the first network entity 2 and the second network entity 4. The processing unit 14 controls the initiation of transmitting of traffic on the previously inactive link. The determination to enable is independent of any determination to enable by the other (remote) network entity.

The thresholds are different for each number of active links. The thresholds can be considered as dynamic, since the thresholds change as the number of active links change.

The determination that the level of the receive and transmit traffic is beyond a threshold is made separately by the first and second network entity 2,4. In particular, each of the first and second network entity 2,4 separately measures the receive and transmit traffic, and compares the receive and transmit traffic with a threshold to determine if the number of active links should change. The first and second network entity 2,4 are configured to separately activate or inactivate one or more links accordingly.

The first and second network entity 2,4 independently change the number of links. In particular, the first network entity 2 determines the levels of receive and transmit traffic, and changes the number of links accordingly, independently of the second network entity 4.

These steps are made substantially simultaneously by both the first and second network entity 2,4. The steps carried out by the first and second network entity 2,4 are independent. The first and second network entity 2,4 base the determination of the active links only on a local measurement of transmit and receive traffic. This avoids the need for signalling between the first and second network entity 2,4 following a determination by only one of the first and second network entity 2,4 that the number of links should change.

If the processing unit 14 determines that a currently active link should be deactivated, a link 8 is selected for deactivation according to a pre-determined order or pattern. In particular, both the first and second network entity 2,4 store or access the same pre-determined order or pattern. Similarly, if the processing unit 14 determines that a further link 8 should be active, the link 8 activated is selected according to a pre-determined order or pattern. Thus, the same link 8 is chosen to be activated or inactivated by the first and second network entity 2, 4 without any exchange of messages. In one example, a link exiting sequence is the opposite of a link entering sequence.

The determination to disable a link is made independently by each network entity. When the first and second network entity 2,4 determine that a particular link is not active, that link is not used by the first and second network entity 2,4 to transmit traffic. For example, the LAG protocol operating in the first and second network entity 2,4 distributes the traffic to one or more of the active links. The processing unit 14 controls the ceasing of transmitting traffic on the previously active link. The first and second network entity 2,4 will make this determination at approximately the same time. Strict coordination is not required, since the first and second network entity 2,4 are merely not using one of the links 8, and both the first and second network entity 2,4 have determined that the remaining links have the capacity to carry the traffic.

After the selected link is no longer used for traffic, the link can be disabled. In particular, an interface or port to the inactive link is disabled. For example, the transmitter and/or receiver are switched off, to obtain a power saving. The transmitter and/or receiver of a link are only switched off after receive and transmit traffic have ceased on that link.

In order to avoid traffic glitches, traffic shall be routed away from the link going to be slept enough time before sleeping. Traffic shall be routed back to the link just after wake up, e.g. by waiting enough time so as to guarantee the link is re-activated.

In some examples, the thresholds are set so that there is a margin between the traffic and capacity of the active links. This ensures that the capacity, i.e. the number of active links, exceeds traffic, for both increasing and decreasing traffic.

As an example, the threshold can be calculated as:

Threshold=bandwidth of links which are active or may be activated by traffic exceeding the threshold–gap bandwidth, where gap bandwidth is a bandwidth of one link+margin.

In an example for thresholds for links of 1 Gbps and by assuming a margin of 20% of one link capacity, example thresholds are shown in Table 1:

TABLE 1

| | Link Number Switching | | |
|---|---|---|---|
| | Between 1 and 2 links | Between 2 and 3 links | Between 3 and 4 links |
| Threshold (Gbps) | 0.8 Gbps | 1.8 Gbps | 2.8 Gbps |

In an example where two links are initially active, the upper threshold to activate three links is 1.8 Gbps, and the lower threshold to inactivate one of the two links is 0.8 Gbps. The upper threshold is calculated from the bandwidth of the links which may be activated, i.e. two active plus one which may be activated, equals three links or 3 Gbps, minus the gap bandwidth, which is the bandwidth of one link (1 Gbps)+20% of one link bandwidth (0.2 Gbps). So in this case threshold is 3 Gbps−1.2 Gbps=1.8 Gbps. The lower threshold is calculated from the bandwidth of the active links (two links in this example, 2 Gbps), minus the gap bandwidth which is the bandwidth of one link (1 Gbps)+20% of one link bandwidth (0.2 Gbps). As such, the threshold is 2−1.2=0.8 Gbps.

Alternatively, the thresholds may be calculated using a margin based on the total bandwidth instead of one link. For example, the percentage (e.g. 20%) is on the total bandwidth. In one example, the thresholds in the above table are 0.8 Gbps, 1.6 Gbps, 2.4 Gbps. Any threshold may be used which ensures that traffic is not lost.

In some examples, the thresholds are configured such that a link does not rapidly oscillate between an active state and an inactive state when the traffic load is near a threshold. In some examples, there is hysteresis between thresholds. Exiting a particular LAG with a number of links and returning to that LAG do not share the same threshold. In particular, the lower threshold from a particular LAG is different than the upper threshold into that LAG.

Therefore the gap bandwidth is different for entering and exiting a particular LAG. In some examples, the gap is different by using a different margin. For example, the margin is higher for a lower threshold than an upper threshold between the same numbers of links.

Figure 2:
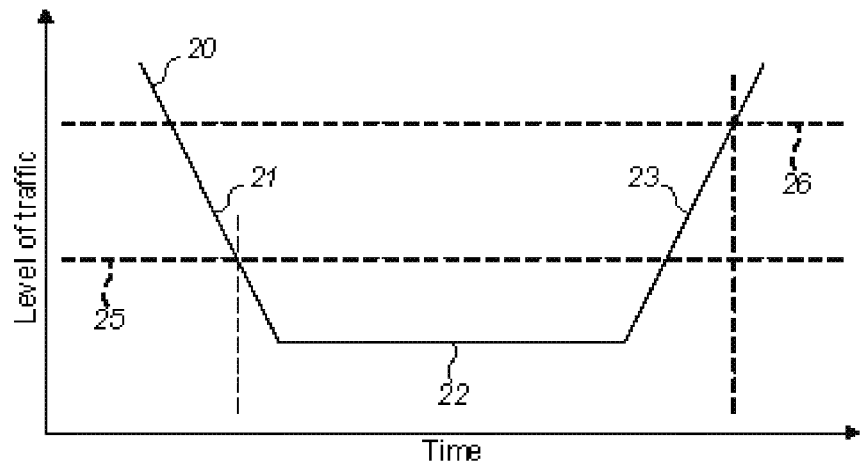
FIG. 2 shows an example of a level of traffic between the first and second network entity varying through thresholds.

FIG. 2 shows an example of a level of traffic 20 which is varying over time between LAG states, i.e. between LAG states in which different numbers of links 8 are active. The level traffic 20 is shown decreasing over time in a first portion 21, remaining static in a second portion 22, and increasing over time in a third portion 23. For this example, receive and transmit traffic is considered equal (and so just termed 'traffic'), and handling of different receive and transmit traffic by the processing unit 14 is described below.

As the traffic 20 decreases in the first portion 21, the traffic falls below a lower threshold 25. The processing unit 14 compares the measurement of the traffic from the local counters 12a,12b with the lower threshold 25, and determines that a lower number of links 8 is possible. The processing unit 14 in each of the first and second network entity causes the LAG to cease transmission in the respective first and second network entity over a pre-determined link. The ports of the first and second network entity for the inactivated link may subsequently be disabled.

In the second portion 22, the level of traffic does not cross a threshold, and so the same number of links remain active to exchange bi-directional traffic.

In the third portion 23, the level of traffic increases. The level of traffic 23 increases without a change in the number of active states until the level exceeds an upper threshold 26. In particular, the lower threshold 25 does not trigger a change in the number of active states. The upper threshold 26 is at a higher traffic level than the corresponding lower threshold 25. For example, the lower threshold 25 has a margin of 20%, and the upper threshold 26 has a margin of 18%.

The processing unit 14 compares the measurement of the traffic from the local counters 12a,12b with the upper threshold 26, and determines that a higher number of links 8 is required. The processing unit 14 in each of the first and second network entity as a first step activates and enables the ports of a pre-determined link from the respective first and second network entity. And as soon as stable, the first and/or second network entity causes the LAG to transmit also on the added link.

The lower threshold 25 applies to both the receive and transmit traffic in order for the LAG state to change to a state with fewer active links, i.e. both receive and transmit traffic must be below this threshold to reduce the number of links 8.

The upper threshold 26 applies to the higher one of the receive and transmit traffic levels, i.e. only one of the receive and transmit traffic being measured above the threshold results in an increase of the number of links 8.

The following Table 2 shows an example of threshold values:

TABLE 2

| | Link Number Increasing | | |
|---|---|---|---|
| | 1 to 2 links | 2 to 3 links | 3 to 4 links |
| Threshold (Gbps) | 0.82 Gbps | 1.82 Gpbs | 2.82 Gbps |
| | Link Number Decreasing | | |
| | 2 to 1 link | 3 to 2 links | 4 to 3 links |
| Threshold (Gbps) | 0.8 Gbps | 1.8 Gpbs | 2.8 Gbps |

In a further example, an upper (restore) threshold 26 may be a first proportion (e.g. 80%) of a current bandwidth. A lower (reduce) threshold 25 may be a second proportion (e.g. 70%) of a current bandwidth minus one link. This threshold proportion may be based on the total bandwidth, or a proportion of the bandwidth of one link (e.g. the link to be removed or last added) and all of the bandwidth of the further active links.

In an example where two links are initially active, the upper threshold to activate three links is 2 Gbps*0.8=1.6 Gbps. The lower threshold to inactivate one of the two links is (2−1)*0.7=0.7 Gbps.

In one example, the processing unit 14 is configured to carry out the following actions:

1) add one link into a LAG if current LAG bit-rate is greater than number of active ports in LAG multiplied by the upper (first) threshold proportion.

2) remove one link from a LAG if current LAG bit-rate is less than (number of active ports in LAG—1) multiplied by the lower (second) threshold proportion An example with a LAG 6 having 8×1 Gb/s links is shown in table 3:

TABLE 3

| No. of active links in LAG | Restore LAG bit-rate [Gbps] | Reduce LAG bit-rate [Gbps] |
|---|---|---|
| 1 | 0.8 | |
| 2 | 1.6 | 0.7 |
| 3 | 2.4 | 1.4 |
| 4 | 3.2 | 2.1 |
| 5 | 4.0 | 2.8 |
| 6 | 4.8 | 3.5 |
| 7 | 5.6 | 4.2 |
| 8 | | 4.9 |

Aspects of the present invention provide a modification to one or both of the network entity(s) providing the terminals to the link aggregation group. Functions of the control of the link aggregation group continue to function as known. For example, the function of detecting a link which is disabled (e.g. a port of the remote terminal is not active) may still be a part of the operation of a network entity or LAG according to an example of the invention. For example, the functions of LACP still generally operate.

Aspects of the present invention provide for the number of active links to be changed without any dedicated handshake or message exchange relating to changing the number of links between the first and second network entities 2,4. The change in the number of active links is determined only using a locally measured (i.e. in the network entity making the determination) level of traffic. In some aspects, there is no additional handshake in addition to LACP. The determination of the level of transmit traffic and receive traffic and changing of the number of active links is independent of the second network entity e.g. without any dedicated or additional handshake.

Aspects of the invention are applicable when only one of the first or second network entity 2,4 are configured with counters 12a,12b and processing unit 14 as described. The other of the first or second network entity 2,4 is a conventional, or legacy, network entity supporting a plurality of communication links, e.g. LAG. The present invention is configured to operate when only one of the first or second network entity 2,4 operates according to an aspect of the invention. This allows power saving even when the LAG is with one legacy device. This is a further advantage of the described method and apparatus which is not applicable to a method based on an exchange of messages or handshaking.

As described above, if the network entity operating according to an example of the present invention detects receive traffic and transmit traffic which are both below a threshold, the network entity will disable a link 8 (i.e. disable a port for that link 8). A remote terminal connected by the LAG, which is a legacy terminal, will detect that the link has been disabled.

As a consequence, the remote (legacy) terminal will get an alarm on that link, and will stop using it.

If the network entity operating according to an example of the present invention detects a level of receive traffic or transmit traffic which are above a threshold, the network entity will (re-)enable the given link 8, as described above. As a consequence, the remote legacy terminal will detect the link as active will (re-)start using that link.

Thus, aspects of the invention are compatible with standard LACP. In particular, the network entity operating according to an example of the present invention will co-work if running in LACP active mode, while the standard network entity on a peer end is running in LACP passive mode. For example, the first network entity 2 runs in a Link Aggregation Control Protocol (LACP) active mode to operate with the second network entity 4 running in a LACP passive mode. The second network entity 4 in this case is not configured to measure traffic levels to change a number of active links, i.e. is a legacy network entity.

In various aspects of the invention, an Energy Aware LAG is configured to change the number of active links as a function of the actual traffic load, such that just the optimal number of links is made available for traffic at the given time. This allows consistent power saving during slack traffic hours, whilst maintaining the scalability and availability of the LAG. Furthermore, the system described is straightforward to implement, since the method is based on the simple read of transmit and receive traffic load at local terminal counters. The described method and apparatus is interoperable with a legacy network using the standard LACP functions.

The method does not require complicated algorithms, or exchange of notification messages, as well as maintaining the advantages of standard LAG and easy interoperating with standard LAG.

Figure 3:
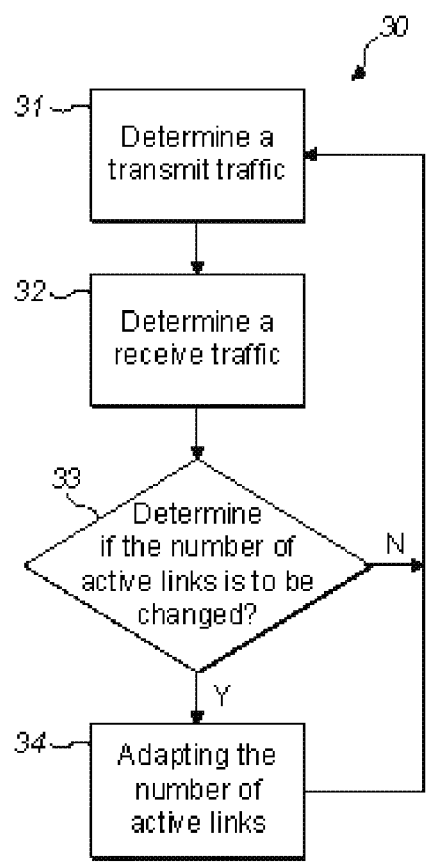
FIG. 3 shows a method according to an embodiment of the present invention.

FIG. 3 shows an example method 30 according to an aspect of the invention. In 31 and 32 a network entity at a terminal of a plurality of communication links (e.g. in a LAG) measures transmit and receive traffic over the communication links. These functions may be carried out substantially simultaneously, or in any order, and the order shown is not limiting. Based on the measured transmit and receive traffic levels, a determination 33 is made on whether one or more requirements for changing the number of active links is met. For example, the transmit and receive traffic levels are compared with one or more threshold.

The determination on changing the number of active links is carried out, e.g. as explained above. The determination may be carried out by a processing unit or other functional unit. If the determination is that the number of links is to be changed, then the network entity carries out or commands the change 34 independently of the other (remote) network entity with which the plurality of communication links connect, and for which the transmit and receive traffic levels are measured.

If no change of active links is required currently, i.e. the one or more requirements for a change are not met, the network entity continues to monitor the levels of transmit and receive traffic. If a change is made, the network entity also continues to monitor the levels of transmit and receive traffic for a further change to the number of active links.

Aspects of the invention have been described as relating to a link aggregation group (LAG). The same method and apparatus is also applicable to a multi-chassis link aggregation group, MC-LAG, or Distributed Resilient Network Interconnect (DRNI) provided by the first network entity and the second network entity. The appropriate interface or port is disabled or enabled according to the method described, to save power whilst providing sufficient bandwidth. The term link aggregation group is considered to include LAG, MC-LAG, DRNI and similar aggregation schemes.

MC-LAG or DRNI comprise a LAG with ports which terminate on separate multiple chassis, locations and/or administrations. This requires cooperation between these separate systems. Aspects of the present method are applicable, with no new requirements on existing control protocols, by assuming each LAG portion acts independently. In some aspects, information (e.g. traffic counters, threshold setting) exchange, as well as processing unit coordination, is carried out, for an energy aware mode at the LAG network entity as a whole.

The first and second network entity 2,4 may alternatively be termed the network entity and remote network entity.

The processing unit and counters are functional units which may be implemented in software or hardware, in any combination with each other or other processors, memory or components of the network entity.

The invention claimed is:

1. A method in a first network entity which is capable of communicating over a plurality of communication links with a second network entity, wherein the method comprises the first network entity performing:
   determining a level of transmit traffic transmitted over the plurality of communication links to the second network entity;
   determining a level of receive traffic received over the plurality of communication links from the second network entity;
   determining if the level of transmit traffic and/or the level of receive traffic meet one or more requirements for changing a number of active links of the communication links, and if so,
   changing the number of active links independently of the second network entity without exchanging messages with the second network entity relating to the change in the number of active links, and
   wherein changing the number of active links independently of the second network entity comprises transmitting transmit traffic on a previously inactive link or ceasing transmitting transmit traffic on a previously active link.

2. The method as claimed in claim 1, wherein changing the number of active links independently of the second network entity comprises enabling a port on a previously inactive link, or disabling a port on a previously active link, independently of the second network entity.

3. The method as claimed in claim 1, wherein the method comprises activating a link if at least one of the level of transmit traffic and the level of receive traffic exceeds an upper threshold.

4. The method as claimed in claim 1, wherein the method comprises inactivating a link if both of the level of transmit traffic and the level of receive traffic is below a lower threshold.

5. The method as claimed in claim 1, wherein an upper threshold for entering a state with a particular number of active links is different than a lower threshold for exiting that state.

6. The method as claimed in claim 1, wherein the first network entity runs in a Link Aggregation Control Protocol (LACP) active mode to operate with the second network entity running in a LACP passive mode, when the second network entity is not configured to determine if a level of transmit traffic and/or the level of receive traffic meet one or more requirements for changing a number of active links of the communication links.

7. The method as claimed in claim 1, wherein changing the number of active links independently of the second network entity comprises changing the number of active links without exchanging messages or information relating to changing the number of active links prior, during or after the changing of the number of active links.

8. The method as claimed in claim 1, wherein the level of transmit traffic and the level of receive traffic are measured in the first network entity.

9. A network entity configured to communicate over a plurality of communication links with a remote network entity, wherein the network entity comprises:
a processor and memory;
wherein the network entity is configured to:
measure a level of receive traffic received over the plurality of communication links from the remote network entity;
measure a level of transmit traffic transmitted over the plurality of communication links to the remote network entity;
wherein the processor is configured to:
determine if the level of transmit traffic and/or the level of receive traffic meet one or more requirements for changing a number of active links of the communication links,
change the number of active links independently of the remote network entity without exchanging messages with the remote network entity relating to the change in the number of active links, and
wherein changing the number of active links independently of the remote network entity comprises transmitting transmit traffic on a previously inactive link or ceasing transmitting transmit traffic on a previously active link.

10. The network entity as claimed in claim 9, wherein the processor being further configured to change the number of active links independently of the remote network entity comprises the processor being configured to enable a port on a previously inactive link, or disable a port on a previously active link.

11. The network entity as claimed in claim 9, wherein the processor is configured to determine activating an additional link if at least one of the level of transmit traffic or the level of receive traffic exceeds an upper threshold.

12. The network entity as claimed in claim 9, wherein the processor is configured to determine inactivating a link if both of the level of transmit traffic and the level of receive traffic is below a lower threshold.

13. The network entity as claimed in claim 9, wherein an upper threshold for entering a state with a particular number of active links is different from a lower threshold for exiting that state.

14. The network entity as claimed in claim 9 wherein the network entity is configured to run in a Link Aggregation Control Protocol (LACP) active mode to operate with the remote network entity running in a LACP passive mode, when the remote network entity is not configured to determine if a level of transmit traffic and/or the level of receive traffic meet one or more requirements for changing a number of active links of the communication links.

15. A system comprising a first network entity and a second network entity capable of communicating over a plurality of communication links,
wherein the first network entity comprises:
a processor and memory;
wherein the first network entity is configured to:
measure a level of receive traffic received over the plurality of communication links from the remote network entity;
measure a level of transmit traffic transmitted over the plurality of communication links to the remote network entity;
wherein the processor is configured to:
determine if the level of transmit traffic and/or the level of receive traffic meet one or more requirements for changing a number of active links of the communication links;
change the number of active links independently of the remote network entity without exchanging messages with the second network entity relating to the change in the number of active links, and
wherein changing the number of active links independently of the remote network entity comprises transmitting transmit traffic on a previously inactive link or ceasing transmitting transmit traffic on a previously active link.

16. The system as claimed in claim 15, wherein the second network entity comprises:
a second processor and memory;
wherein the second network entity is configured to:
measure a level of receive traffic received over the plurality of communication links from the remote network entity;
measure a level of transmit traffic transmitted over the plurality of communication links to the remote network entity;
wherein the second processor is configured to:
determine if the level of transmit traffic and/or the level of receive traffic meet one or more requirements for changing a number of active links of the communication links, and
adapt the number of active links independently of the first network entity.

17. The system as claimed in claim 15 wherein the second network entity is not configured to determine if a level of transmit traffic and/or the level of receive traffic meet one or more requirements for changing a number of active links of the communication links, wherein the second network responds to a change in the number of active links enabled by the first network entity using Link Aggregation Control Protocol (LACP).

18. A nontransitory computer readable storage medium comprising a computer program product, configured when run on a computer to conduct a method in a first network entity which is capable of communicating over a plurality of communication links with a second network entity, wherein the method comprises the first network entity performing:

determining a level of transmit traffic transmitted over the plurality of communication links to the second network entity;

determining a level of receive traffic received over the plurality of communication links from the second network entity;

determining if the level of transmit traffic and/or the level of receive traffic meet one or more requirements for changing a number of active links of the communication links, and if so, changing the number of active links independently of the second network entity without exchanging messages with the second network entity relating to the change in the number of active links, and wherein changing the number of active links independently of the second network entity comprises transmitting transmit traffic on a previously inactive link or ceasing transmitting transmit traffic on a previously active link.

* * * * *